(12) United States Patent
Mase

(10) Patent No.: US 10,519,348 B2
(45) Date of Patent: Dec. 31, 2019

(54) PROTECTIVE FILM WITH ADHESIVE LAYER AND WITH SEPARATOR

(71) Applicant: Power Support Co., Ltd., Tokyo (JP)

(72) Inventor: Ryoichi Mase, Tokyo (JP)

(73) Assignee: Power Support Co., Ltd., Tokyo (JP)

( * ) Notice: Subject to any disclaimer, the term of this patent is extended or adjusted under 35 U.S.C. 154(b) by 209 days.

(21) Appl. No.: 14/422,942

(22) PCT Filed: Aug. 8, 2013

(86) PCT No.: PCT/JP2013/071480
§ 371 (c)(1),
(2) Date: Feb. 20, 2015

(87) PCT Pub. No.: WO2014/030549
PCT Pub. Date: Feb. 27, 2014

(65) Prior Publication Data
US 2015/0218419 A1 Aug. 6, 2015

(30) Foreign Application Priority Data
Aug. 21, 2012 (JP) .................................. 2012-181961

(51) Int. Cl.
*B32B 3/30* (2006.01)
*C09J 7/40* (2018.01)

(52) U.S. Cl.
CPC .......... *C09J 7/403* (2018.01); *C09J 2201/122* (2013.01); *C09J 2201/16* (2013.01); *Y10T 428/15* (2015.01)

(58) Field of Classification Search
CPC .... B32B 3/30; B32B 2307/518; C09J 7/0232; C09J 7/026; C09J 2201/122; C09J 2201/16; C09J 2203/318; Y10T 428/15
See application file for complete search history.

(56) References Cited

U.S. PATENT DOCUMENTS

| | | | | |
|---|---|---|---|---|
| 2,681,732 A * | 6/1954 | Brady | ........................ | C09J 7/20 206/447 |
| 3,706,626 A * | 12/1972 | Smith | ........................ | G09F 3/10 428/42.3 |
| 5,135,790 A * | 8/1992 | Kaplan | .................. | B65D 75/66 229/238 |
| 5,783,266 A * | 7/1998 | Gehrke | .................. | B32B 27/00 428/34.3 |
| 5,914,165 A * | 6/1999 | Freedman | ................. | B32B 7/06 428/40.1 |

(Continued)

FOREIGN PATENT DOCUMENTS

JP    06-172724 A    6/1994
JP    2007327012 A   12/2007
(Continued)

OTHER PUBLICATIONS

JP 2011219685_machine translation.*
(Continued)

*Primary Examiner* — Travis M Figg
(74) *Attorney, Agent, or Firm* — Maier & Maier, PLLC

(57) ABSTRACT

Provided is an adhesive layer-equipped protective film including a separator which is formed of a biaxially oriented film and can be easily divided. A protective film includes an adhesive layer-equipped film and a separator pasted to the film. The separator is formed of a biaxially oriented film and has a guide groove serving as a guide for separating the separator.

5 Claims, 9 Drawing Sheets

(56) References Cited

U.S. PATENT DOCUMENTS

| | | | | |
|---|---|---|---|---|
| 6,146,731 | A * | 11/2000 | Tanoto | B32B 7/04 428/43 |
| 2002/0081405 | A1* | 6/2002 | Marbler | B29C 59/007 428/35.2 |
| 2005/0167026 | A1* | 8/2005 | Dronzek | B65B 61/182 156/69 |
| 2005/0179548 | A1* | 8/2005 | Kittel | G06K 19/07798 340/568.2 |
| 2005/0226542 | A1* | 10/2005 | Kendall | B65D 27/14 383/207 |
| 2006/0225320 | A1* | 10/2006 | Dregalla | B65D 55/0818 40/311 |
| 2010/0104793 | A1* | 4/2010 | Mathieu | B29C 65/02 428/43 |
| 2011/0165360 | A1* | 7/2011 | Mase | B32B 7/06 428/40.1 |
| 2012/0298734 | A1* | 11/2012 | Bradshaw | C09J 11/08 229/212 |
| 2013/0008134 | A1* | 1/2013 | Kim | B65D 33/22 53/396 |
| 2013/0239770 | A1* | 9/2013 | Gluck | B26D 3/085 83/880 |

FOREIGN PATENT DOCUMENTS

| | | | | |
|---|---|---|---|---|
| JP | 3142562 | U | * | 6/2008 |
| JP | 3142562 | U | * | 6/2008 |
| JP | 2011219685 | A | * | 11/2011 |
| JP | 2011219685 | A | * | 11/2011 |
| JP | 2011-241370 | A | | 12/2011 |
| JP | 3177192 | U | | 7/2012 |

OTHER PUBLICATIONS

JP 3142562 U Translation.*
JP-3142563-U Machine Translation.*
JP-2011219685-A Machine Translation.*
Definition of perpendicular (Year: 2019).*
International Search Report dated Nov. 12, 2013 from corresponding International Patent Application No. PCT/JP2013/071480; 4 pgs.

* cited by examiner

FIG. 1
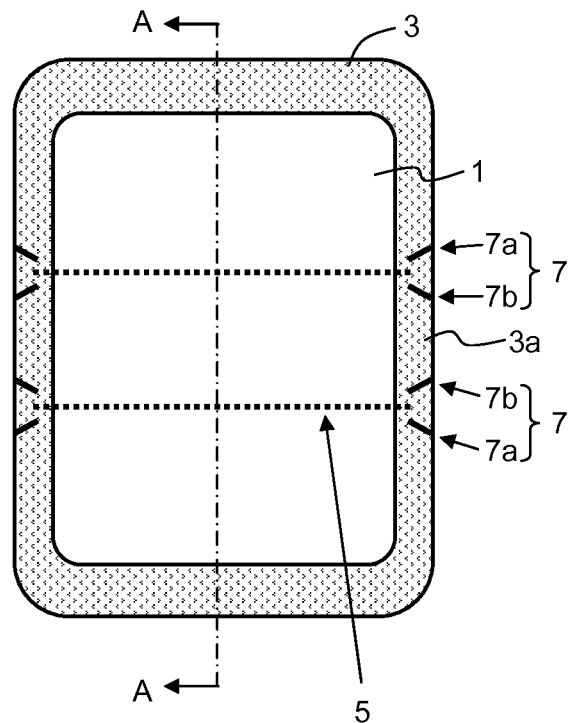
FIG. 2  LINE A-A SECTIONAL END SURFACE VIEW
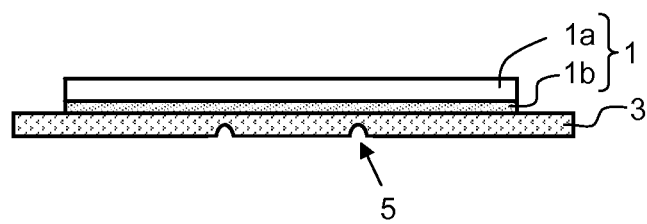
FIG. 3  RIGHT SIDE VIEW
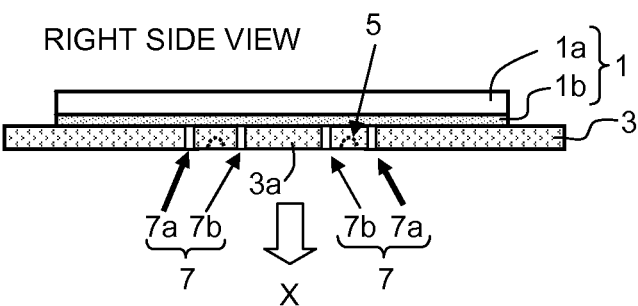

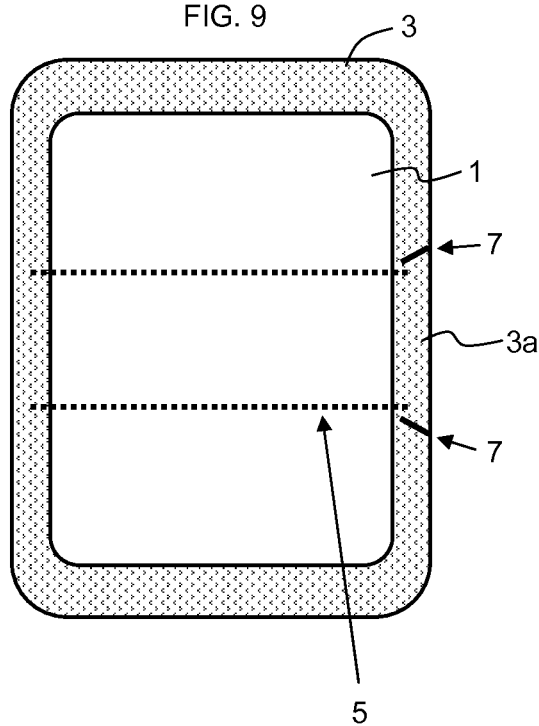
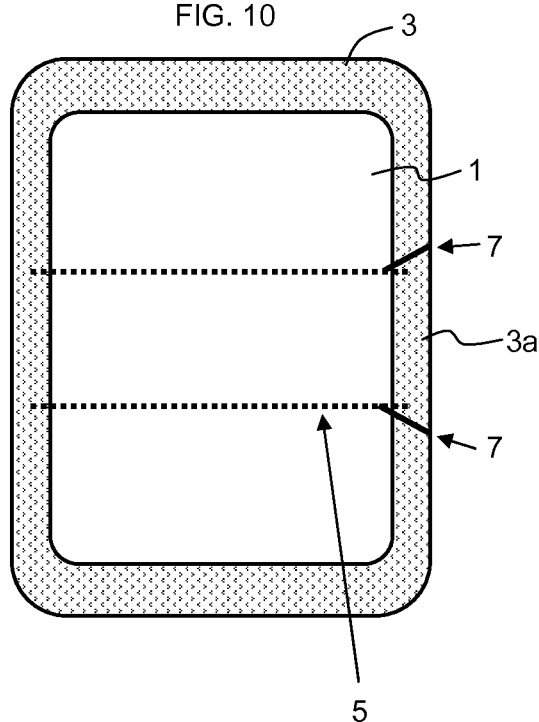

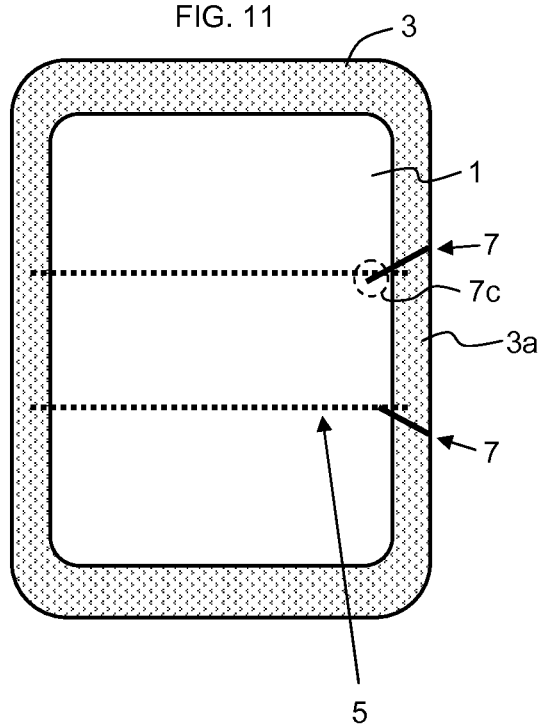
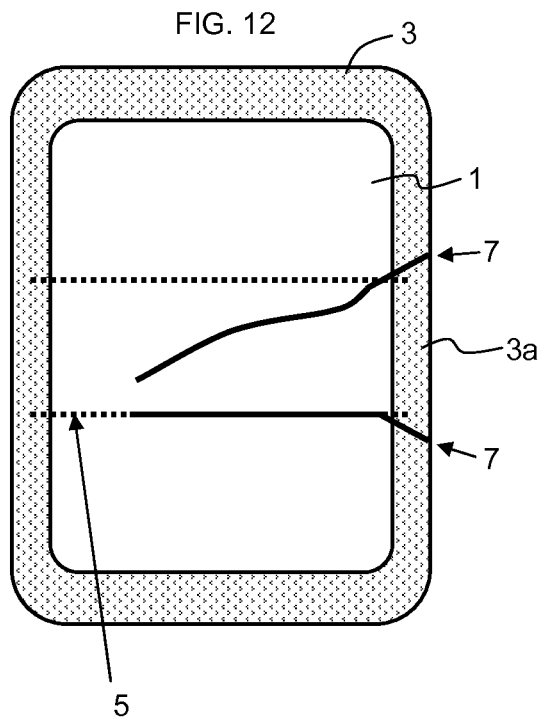

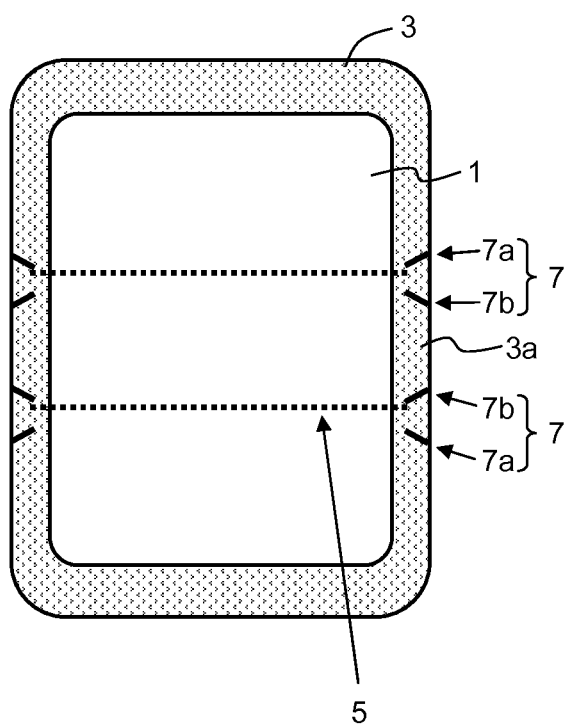

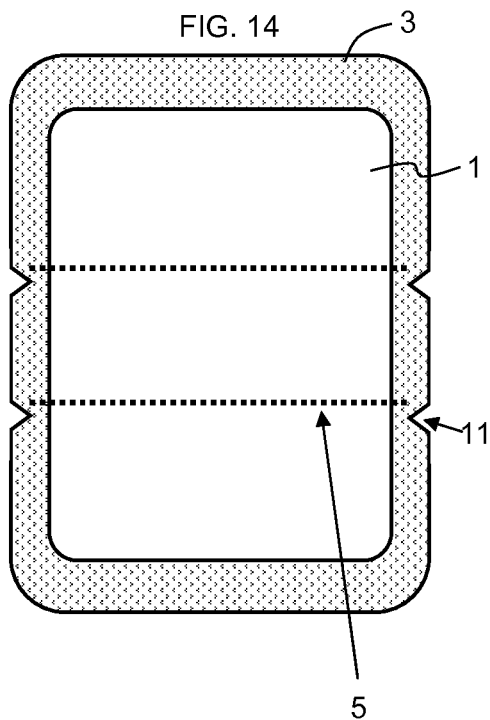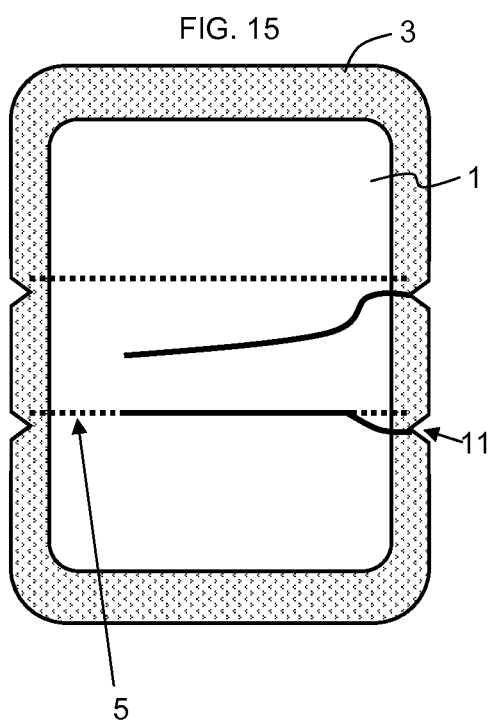

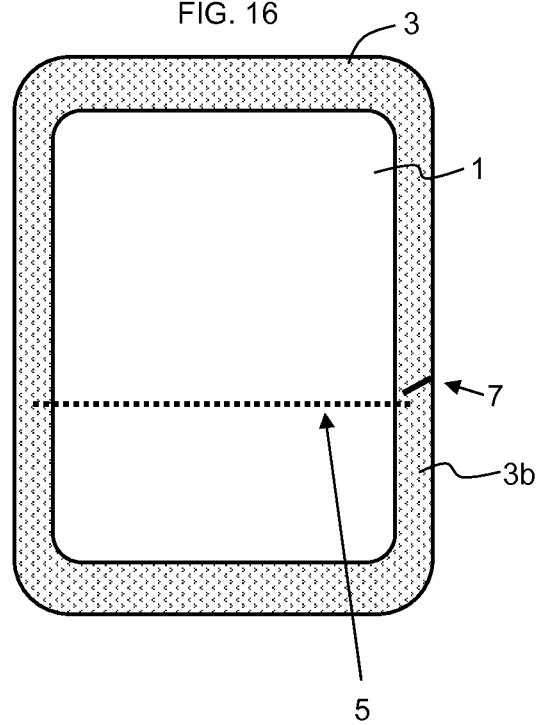

PROTECTIVE FILM WITH ADHESIVE LAYER AND WITH SEPARATOR

TECHNICAL FIELD

The present invention relates to a protective film including an adhesive layer-equipped film for protecting a liquid crystal screen or the like and a separator pasted to the film and intended to protect the adhesive layer of the film.

BACKGROUND ART

When the user pastes an adhesive layer-equipped protective film to a liquid crystal screen or the like in order to protect the screen, he or she has to correctly paste the protective film in accordance with the size of the screen. However, the traditional art has difficulty in setting a correct pasting position.

Traditionally, when pasting a protective film to a liquid crystal screen or the like in accordance with the size of the screen, the entire separator has to be peeled off. At this time, stains on the hand tend to attach to the adhesive layer surface of the protective film, and only rough alignment can be performed.

Known technologies to solve such problems include one which uses a separator formed of a uniaxially oriented film so that the separator can be easily divided into multiple portions (for example, see Patent Literature 1).

PATENT LITERATURE

[Patent Document 1] Japanese Unexamined Patent Application Publication No. 2011-241370.

SUMMARY OF INVENTION

Technical Problem

However, uniaxially oriented films are distributed in a smaller amount in the market, and it is not necessarily easy to acquire a film satisfying property requirements (e.g., extremely high flatness) for the separator of an adhesive layer-equipped protective film.

For this reason, the inventors attempted to form a separator from a biaxially oriented film in place of a uniaxially oriented film. However, unlike a uniaxially oriented film, a biaxially oriented film cannot be easily torn in one direction in nature. Accordingly, a separator formed therefrom is not easy to neatly divide.

The present invention has been made in view of the foregoing, and an object thereof is to provide is an adhesive layer-equipped protective film including a separator which is formed of a biaxially oriented film and can be easily divided.

Solution to Problem

The present invention provides a protective film including an adhesive layer-equipped film and a separator pasted to the film. The separator is formed of a biaxially oriented film and has a guide groove serving as a guide for separating the separator.

By forming a guide groove in a biaxially oriented film, the biaxially oriented film can be neatly divided along the guide groove with ease. By using, as a separator, a biaxially oriented film having such a guide groove, there can be obtained an adhesive layer-equipped protective film including a separator which is formed of a biaxially oriented film and can be easily divided.

The usage of this protective film includes partially separating and peeling off the separator along the guide groove to partially expose the adhesive layer, pasting the exposed adhesive layer to a liquid crystal screen or the like, then peeling off the remaining separator to expose the remaining adhesive layer, and pasting the exposed adhesive layer to the liquid crystal screen. When the user pastes the protective film in this manner, he or she is prevented from touching the adhesive layer surface with any finger for alignment. Thus, the protective film can be easily pasted to the correct position without staining the adhesive layer surface.

According to the present invention, it is possible to replace uniaxially oriented films, which have been used as separators, with biaxially oriented films and thus to obtain effects such as stable availability, reductions in acquisition cost, and reductions in manufacturing cost. Further, a biaxially oriented film is harder than a uniaxially oriented film and therefore is advantageous in that when a hole is formed in a protective film including a separator and adhesive layer by punching it, the protective film is less likely to be deformed around the hole. Further, a separator formed of a uniaxially oriented film is more likely to be torn and therefore must be pasted to an adhesive layer-equipped film at lower speed in a roll-to-roll process. On the other hand, a separator formed of a biaxially oriented film is less likely to be torn and therefore can be pasted at higher speed, resulting in an increase in manufacturing efficiency.

Various embodiments of the present invention are exemplified below. Any embodiments below can be combined with each other.

Preferably, the separator has a division start portion serving as a guide for separating the separator along the guide groove.

Preferably, the division start portion is a slit, a notch, or a groove deeper than the guide groove.

Preferably, the division start portion extends from an edge of the separator toward the guide groove.

Preferably, the division start portion is not in contact with the guide groove.

Preferably, the division start portion is formed in at least two positions which sandwich the guide groove.

Preferably, the guide groove is formed in at least two positions which are substantially in parallel.

BRIEF DESCRIPTION OF THE DRAWINGS

FIG. 1 is a plan view of a protective film including a separator and adhesive layer of an embodiment of the present invention (the division start portion is a slit).

FIG. 2 is a sectional end surface view taken along line A-A of FIG. 1.

FIG. 3 is a right side view of FIG. 1 showing a state in which the central portion of a separator is being pulled in the direction of an arrow X.

FIG. 9 is a plan view of an embodiment where only one slit is formed for each guide groove.

FIG. 10 is a plan view of an embodiment where slits are in contact with guide grooves.

FIG. 11 is a plan view showing a state in which a slit is cutting across a guide groove.

FIG. 12 is a plan view showing a state in which the separator of FIG. 11 is being divided irregularly.

FIG. 13 is a plan view showing a state in which the positions of the slits with respect to the guide grooves are vertically displaced.

FIG. 14 is a plan view showing a state in which relative positions between the notches and guide grooves are vertically displaced.

FIG. 15 is a plan view showing a state in which the separator of FIG. 14 is being divided irregularly.

FIG. 16 is a plan view showing an embodiment where a single guide groove is formed.

EMBODIMENTS

Figure 4:
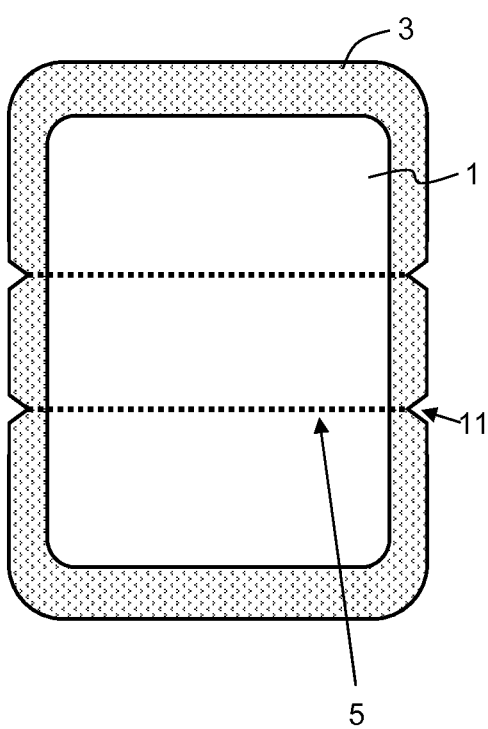
FIG. 4 is a plan view of an embodiment where the division start portions are notches.

Now, an embodiment of the present invention will be described. Note that the embodiment described below is illustrative only and does not limit the present invention.

FIG. 1 is a plan view showing the configuration of a protective film of an embodiment of the present invention; FIG. 2 is a sectional end surface view taken along line A-A of FIG. 1; and FIG. 3 is a right side view of FIG. 1.

The protective film of the present embodiment includes an adhesive layer-equipped film 1 and a separator 3 pasted to the film 1. The separator 3 is formed of a biaxially oriented film and has guide grooves 5 serving as guides for separating the separator 3. The adhesive layer-equipped film 1 includes a substrate 1a and an adhesive layer 1b, and a surface of the adhesive layer 1b is pasted to the separator 3.

The adhesive layer-equipped film 1 may be any type of adhesive layer-equipped film as long as it has flatness or transparency required to protect a liquid crystal screen or the like.

The separator 3 is formed of a biaxially oriented film. The greatest reason why a biaxially oriented film is used in the present invention is the high availability thereof. Biaxially oriented films are distributed in the market in a much larger amount than are uniaxially oriented films. Accordingly, it is much easier to acquire a biaxially oriented film having properties required of a separator for an adhesive layer-equipped protective film (flatness, thickness, strength, and the like). For this reason, a "biaxially oriented film" in the present invention should be construed as widely as possible. The material or stretching ratio of a biaxially oriented film is not particularly limited as long as the biaxially oriented film can serve as the separator 3, and the vertical and horizontal stretching ratios may differ from each other.

A problem with using a biaxially oriented film as the separator 3 is that polymers are not orientated in one direction in the biaxially oriented film and therefore the biaxially oriented film is not easy to cut linearly, unlike a uniaxially oriented film. This problem is solved by forming the guide grooves 5 in the separator 3 and separating the separator 3 along the guide grooves 5.

The width or depth of the guide grooves 5 is set as appropriate so that the separator 3 is divided along the guide grooves 5. In FIG. 2, the depth of the guide grooves 5 is about half that of the separator 3, but the depth may be larger or smaller as long as the guide grooves 5 serve as guides for separating the separator 3. However, the guide grooves 5 preferably do not reach the adhesive layer 1b. Guide grooves 5 reaching the adhesive layer 1b expose the adhesive layer 1b to the outside air, degrading the film 1. Thus, when the film 1 is pasted to a liquid crystal screen or the like, lines may appear in positions corresponding to the guide grooves 5.

The separator 3 also has division start portions serving as guides for separating the separator 3 along the guide grooves 5. Even if there are no division start portions, the present invention can be carried out. However, if the separator 3 is thick or the guide grooves 5 do not reach the edges of the separator 3, it may not be easy to divide the separator 3 along the guide grooves 5 (a large force may be required). In such cases, by providing division start portions in the separator 3 and separating the separator 3 using the division start portions as start points, the separator 3 can be easily divided.

The division start portions may be configured in any manner as long as they serve as start points for separating the separator 3, but those portions are preferably slits 7, notches 11, or grooves deeper than the guide grooves 5. A slit refers to an area in which the separator 3 is cut linearly, and a notch refers to an area in which the separator 3 is cut off in such a manner that a vertex is formed at the end thereof, as shown in FIG. 4. A groove deeper than the guide groove 5 refers to, for example, a groove having a depth corresponding to most (e.g., 90%) of the thickness of the separator 3. Such deep grooves allow the separator 3 to be cut easily from these grooves and therefore serve as division start portions, as with the slits 7.

In the present embodiment, the division start portions are the slits 7 extending from the edges of the separator 3 toward the guide grooves 5. In the present embodiment, two guide grooves 5 are formed substantially in parallel, and two slits 7 are formed for each end of each guide groove 5 in such a manner to sandwich the guide groove 5 (a slit 7b adjacent to the center of the separator 3 with respect to the guide groove 5, a slit 7a remote from the center with respect thereto). That is, a total of four slits 7 are formed for each guide groove 5.

Figure 5:
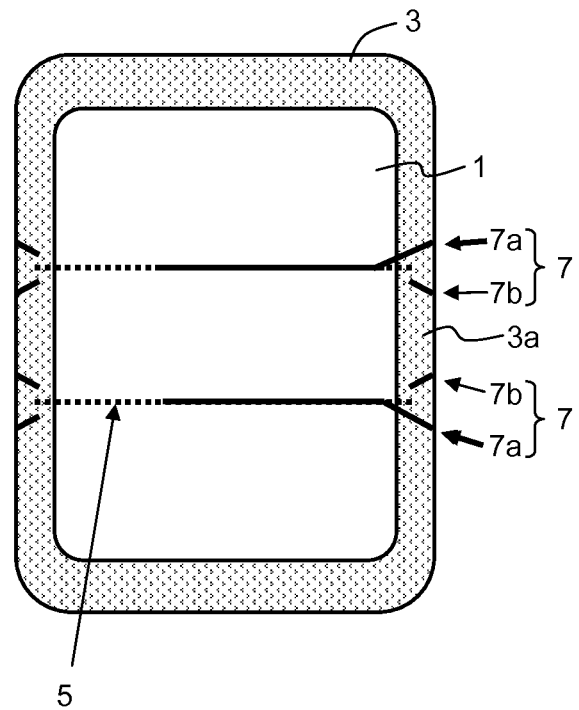
FIG. 5 is a plan view showing a state in which the separator is being divided along guide grooves.
Figure 6:
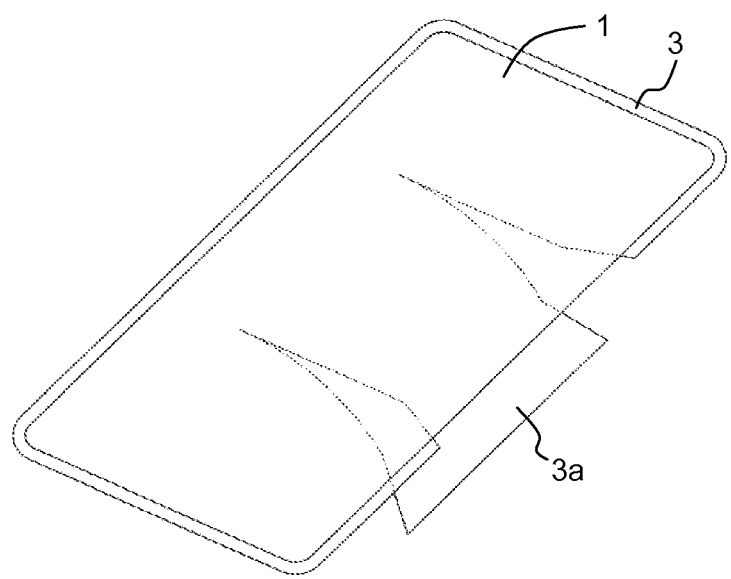
FIG. 6 is a perspective view showing a state in which the separator is being divided along the guide grooves.

By holding a central portion 3a of the separator 3 sandwiched between the two guide grooves 5 and then pulling the central portion 3a in the direction of an arrow X in FIG. 3 (in the direction opposite to the direction toward the film 1), the separator 3 begins to be divided from the two slits 7a, which are remote from the center, toward the guide grooves 5. After the slits reach the guide grooves 5, the central portion 3a of the separator 3 is divided along the guide grooves 5, as shown in FIGS. 5 and 6, and then is peeled off.

Since the two slits 7 are formed at each end of each guide groove 5, the central portion 3a of the separator 3 can be peeled off from any side of the separator 3. Thus, both left-handed and right-handed users can easily use this protective film.

Figure 7:
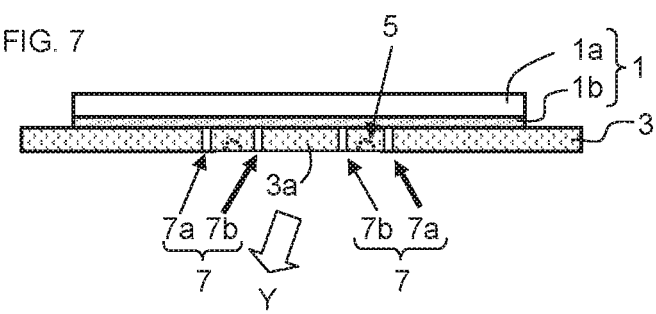
FIG. 7 is a right side view of FIG. 1 showing a state in which the central portion of the separator is being pulled in the direction of an arrow Y.
Figure 8:
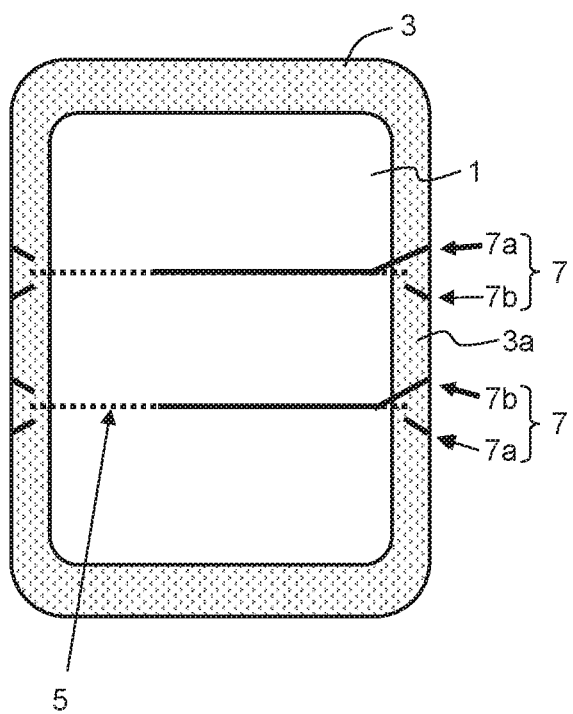
FIG. 8 is a plan view showing a state in which the separator is being divided while the central portion thereof is pulled in the direction of the arrow Y.

Further, the slits 7a and 7b are formed on each side of each guide groove 5. Accordingly, when the user pulls the central portion 3a of the separator 3 diagonally as shown in FIG. 7, the central portion 3a begins to be divided not from the two outer slits 7a but from two slits, 7a and 7b, extending in a direction close to the pulling direction of the user, as shown in FIG. 8. Thus, the separator 3 can be divided more smoothly.

As seen above, four slits 7 are preferably provided for each guide groove 5. However, slits 7a and 7b may be formed only for one end of each guide groove 5, or only one slit 7 may be formed as shown in FIG. 9.

In FIG. 1, the slits 7 and guide grooves 5 are not in contact with each other. Accordingly, the separator 3 begins to be divided with no guides. However, the slits reach the grooves 5 shortly and then the separator 3 is divided in one direction.

As shown in FIG. 10, the slits 7 and guide grooves 5 may be in contact with each other. This is advantageous in that once the separator 3 begins to be divided, the division proceeds along the guide grooves 5. However, when any slit 7 cuts across a guide groove 5 even slightly due to manufacturing tolerances or the like, as shown by a dotted circle 7c in FIG. 11, the separator 3 is no longer divided along the guide groove 5, as shown in FIG. 12, that is, it is divided irregularly. In the present embodiment, on the other hand, the slits 7 and guide grooves 5 are not in contact with each other, that is, the slits and grooves are spaced from each other. Thus, even when the position of any slit 7 varies due to manufacturing tolerances or the like, the slit 7 is reliably prevented from cutting across the guide groove 5.

As shown in FIG. 13, the function of the slits 7 is not affected even when the slits 7 are vertically displaced to some extent. On the other hand, when the notches 11 are vertically displaced even to some extent, as shown in FIG. 14, the division from one notch 11 may not reach the corresponding guide groove 5 and thus the separator 3 may be divided irregularly, as shown in FIG. 15. For the slits 7, they need not be in exact alignment with the guide grooves 5, resulting in an increase in manufacturing efficiency.

The number of guide grooves 5 may be one, as shown in FIG. 16. In this case, by holding a lower portion 3b of the separator 3 and then pulling it toward the back of FIG. 16, only the lower portion 3b can be divided and peeled off.

REFERENCE SIGNS LIST

1: adhesive layer-equipped film,
1a: substrate 1a,
1b: adhesive layer,
3: separator,
5: guide groove,
7: slit,
7a: slit outside guide groove,
7b: slit inside guide groove,
11: notch

The invention claimed is:
1. A protective film comprising:
an adhesive layer-equipped film; and
a separator pasted to the film,
wherein the separator is formed of a biaxially oriented film and has first and second guide grooves that do not reach the adhesive layer,
wherein the separator has first and second division start portions serving as a guide for separating the separator along the first guide groove, said first and second division start portions lying along a first plane which lies along an edge of the separator, said first plane being perpendicular to a direction of extent of the first guide groove, and wherein the separator further has third and fourth division start portions serving as a guide for separating the separator along the second guide groove, said third and fourth division start portions lying along a second plane which lies along the edge of the separator, said second plane being perpendicular to a direction of extent of the second guide groove,
wherein said first and second division start portions extend from the edge of the separator toward the first guide groove, and
wherein said third and fourth division start portions extend from the edge of the separator toward the second guide groove,
wherein said first and second division start portions are formed in first and second positions which sandwich the first guide groove along the first plane, and
wherein the third and fourth division start portions are formed in third and fourth positions which sandwich the second guide groove along the second plane, and
the first guide groove comprises a first end and a second end, wherein the first and second division start portions are provided at the first end of the first guide groove, and
the second guide groove comprises a third end and a fourth end, wherein the third and fourth division start portions are provided at the third end of the second guide groove, and
the first and third ends are provided side-by-side.
2. The film of claim 1, wherein
at least one of the first and second division start portions is a slit or a groove deeper than the first guide groove, wherein the at least one of the first and second division start portions and the first guide groove are separate elements.
3. The film of claim 1, wherein
the first and second division start portions are not in contact with the first guide groove.
4. The film of claim 1, wherein
the first guide groove and the second guide groove are formed substantially in parallel.
5. The film of claim 1, wherein
the first guide groove and the second guide groove are formed in substantially parallel, and
wherein the first division start portion and the second division start portion are configured to be parallel to each other.

* * * * *